March 21, 1967 W. M. KAUFFMANN ETAL 3,309,865
INTERNAL COMBUSTION ENGINE

Filed April 1, 1965 2 Sheets-Sheet 1

WILLIAM M. KAUFFMANN
DIETRICH BIRKHOLZ
*INVENTORS*

WILLIAM M. KAUFFMANN
DIETRICH BIRKHOLZ
INVENTORS

United States Patent Office 3,309,865
Patented Mar. 21, 1967

3,309,865
INTERNAL COMBUSTION ENGINE
William M. Kauffmann, Hamburg, and Dietrich Birkholz, Williamsburg, N.Y., assignors to Worthington Corporation, Harrison, N.J., a corporation of Delaware
Filed Apr. 1, 1965, Ser. No. 454,233
4 Claims. (Cl. 60—13)

ABSTRACT OF THE DISCLOSURE

This invention relates to internal combustion engines and more particularly to a constant pressure turbo-charged uniflow two cycle engine of higher overall cycle efficiency than conventional uniflow models deriving this result by integrally incorporating a system of differentially timed dual exhaust valves, which valves sequence overlap the inlet port while the inlet ports are opened unsymmetrically at piston bottom dead center position, with all exhaust valves discharging into a pressure equalizing manifold whereby full turbocharging occurs above atmospheric pressure, thereby obtaining the complete expansion cycle described hereinbelow.

---

Figure 1:
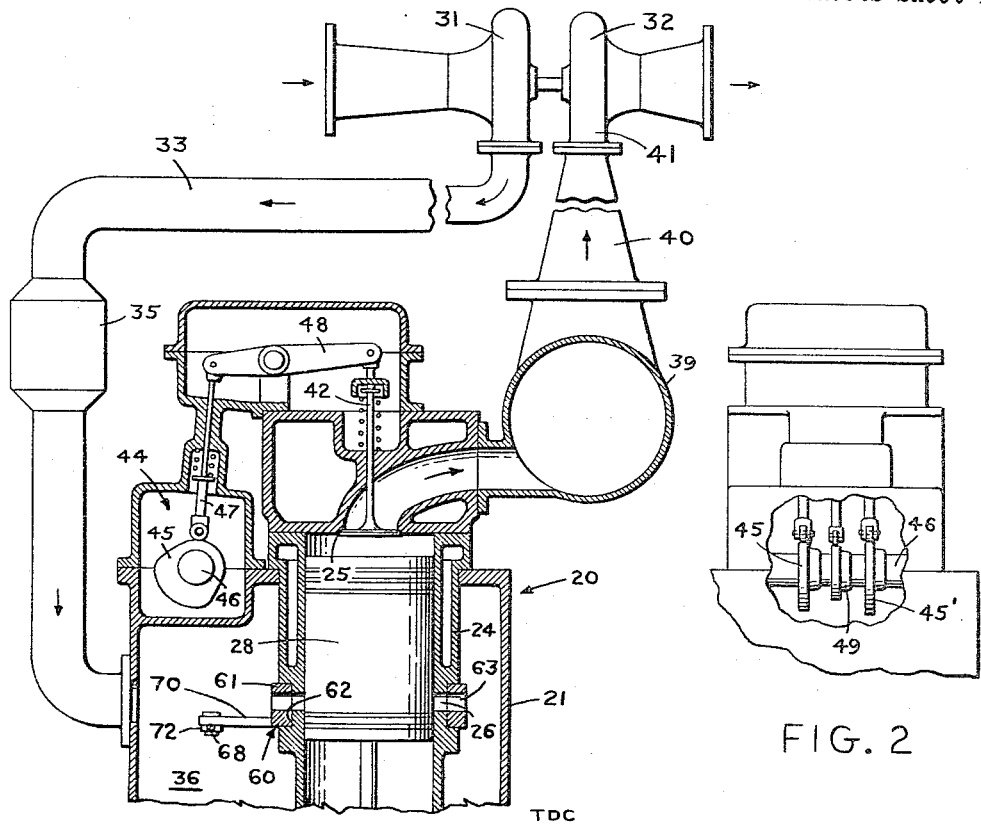

Some of the known problems inherent in engines of the type contemplated herein are dilution of the exhaust which results from scavenging air passing to the exhaust manifold and expansion of gases is limited as a result of exhaust valve opening on the power stroke.

Such drawbacks combine to limit the power output and reduce the thermal efficiency of the engine. Additionally, full advantage of the power cycle work is curtailed since maximum expansion work is not fully utilized and late exhaust valve closing while resulting in lower compression ratio and expected gain in overall efficiency will result in air loss disadvantage also termed dilution of the exhaust.

The present invention overcomes the above objections by the inclusion of means preferably with a turbo-charged internal combustion engine which reduce air loss to a minimum while retaining the advantage of late exhaust valve closing as will be described in detail hereinafter.

The system of charging contemplated herein is termed constant pressure or steady state. The exhaust gases expelled from the cylinder are converted from a steep pulse in the cylinder head exhaust passage to a relatively uniform pressure gradient in the large volume exhaust manifold or chamber. This uniform, or steady state, pressure permits the turbo-charger to operate at its maximum design efficiency.

Compressor work is a function of pressure ratio, inlet air and discharge air temperature. Turbine work is a function of turbine pressure ratio, preturbine gas temperature and stack temperature.

Of these parameters, compressor efficiency is important, as air flow for a given pressure ratio is directly proportional to efficiency. Thus, a greater air flow will require higher overall efficiency in the order of 80 percent. Therefore any expenditure of scavenging air for other than purging the cylinder is balanced against increased blower efficiency.

The steady state uniflow exhaust system obtains these high efficiencies since the turbo-charger operates close to its theoretical parameters.

The cycle described herein consists of two basic blowdown periods, namely exhaust and cylinder charge blowdown. In the primary, or exhaust blowdown dual exhaust valves open and the burnt gases are discharged to the exhaust manifold and gas turbine end of the turbo-charger. This phase terminates at scavenging port opening.

The secondary blowdown period, scavenging air ports are closed and the engine cylinder is charged with trapped fresh air at air manifold pressure. In order to retain a greater volume of trapped air for combustion, only one valve of the dual valve construction, remains open, thereby restricting the secondary blowdown. The terminal cylinder pressure at the end of secondary blowdown is higher than exhaust manifold pressure thus contributing to a greater trapped air weight, compression pressure, and cycle efficiency.

Since the closing of the blowdown valve initiates compression of the air in the cylinder, it serves a dual purpose. It controls the mixture in the cylinder by limiting and reducing the trapped air amount, and also controls the actual compression ratio and thereby, the compression pressure and temperature in the cylinder at the termination of the compression stroke of the piston of the two cycle engine.

Accordingly, it is an object of this invention to provide an internal combustion engine with the above mentioned advantages.

It is a further object of this invention to provide a design which achieves high operational efficiency.

Figure 3:
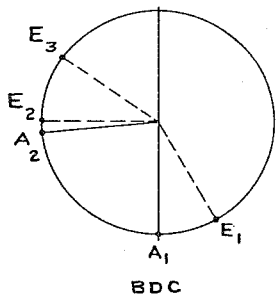
Figure 4:
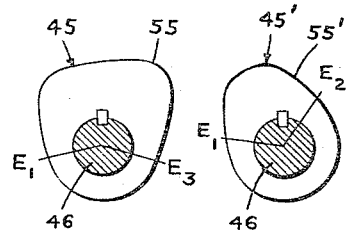
Figure 5:
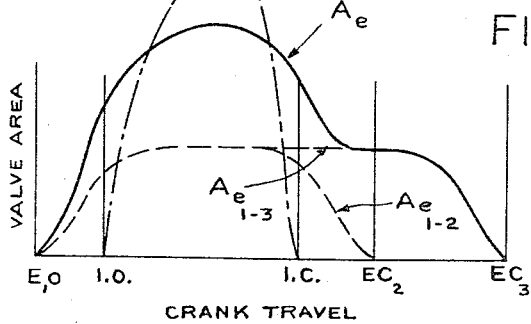
Figure 6:
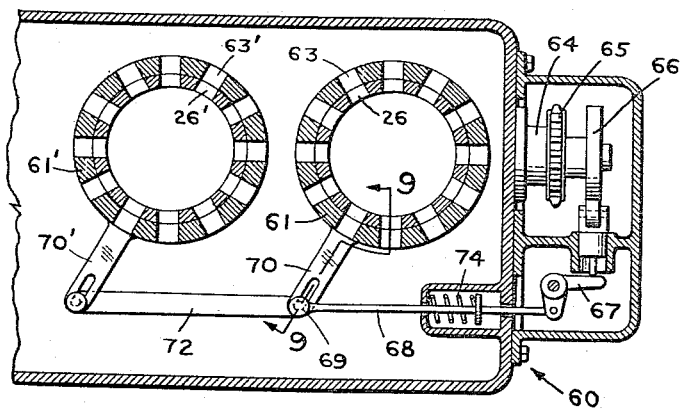
Figure 7:
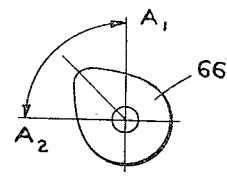
Figure 8:
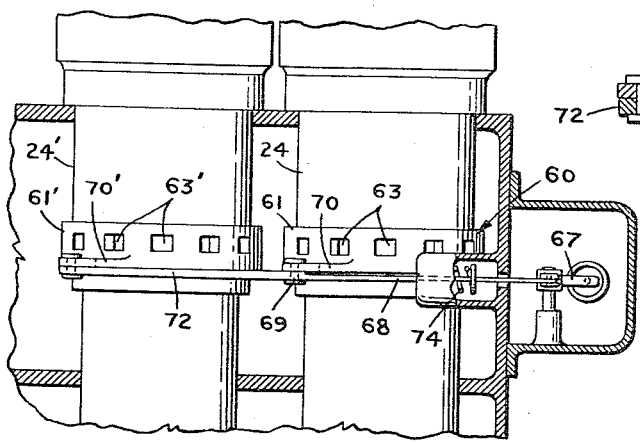
Figure 9:
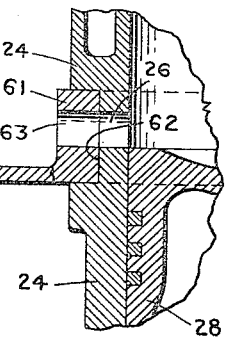
Figure 10:
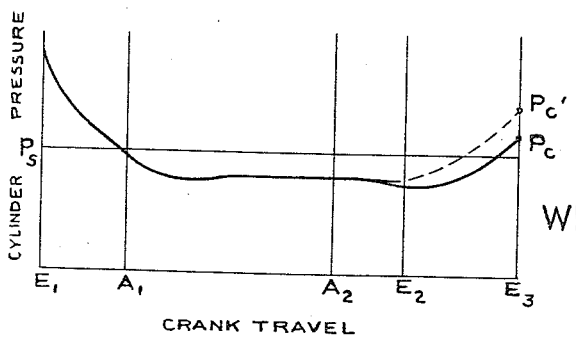
Figure 11:
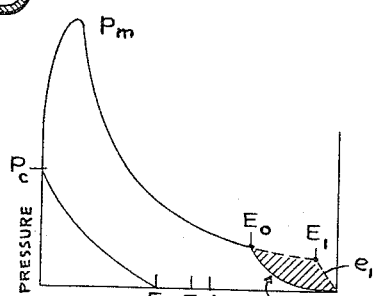

Other objects and advantages of the invention including the basic design and the nature of the improvements thereon will appear from the following description taken in conjunction with the following drawings, in which:

FIGURE 1 is a fragmentary section of the engine.
FIGURE 2 is a view of the cam actuators for the engine.
FIGURE 3 is a diagram illustrating the timing of the engine cycle.
FIGURE 4 is an enlarged view showing the contour characteristics of the cam which actuate the exhaust valves.
FIGURE 5 is a graph showing the effective valve areas.
FIGURE 6 is a section taken thru two cylinders of an engine showing the means for regulating entry of fluid along with the means for operating said regulating means.
FIGURE 7 is an enlarged view showing the contour of the cam of FIGURE 6.
FIGURE 8 is a side elevation of the cylinders and apparatus of FIGURE 6.
FIGURE 9 is an enlarged section taken on lines 9—9 of FIGURE 6.
FIGURE 10 is a chart showing cylinder pressure plotted against crank travel to highlight sequence of exhaust and scavening events of the engine contemplated herein.
FIGURE 11 is a pressure volume diagram for the engine contemplated herein.

It is to be understood that the description which follows is exemplary of a preferred form of construction and for convenience in the drawings like parts have been given the same reference characters.

Now referring to the schematic representation of the invention, in FIGURE 1 there is shown a uniflow turbocharged internal combustion engine designated 20 comprising a main frame 21 which receives a plurality of cylinder liners 24 one of which is shown. The liner or cylinder is provided with the usual inlet and exhaust openings respectively shown as exhaust port 25 and inlet ports 26 which penetrate the inner and outer walls of the cylinder.

Reciprocating piston 28 operates to regulate the flow of air or working fluid into the cylinder. In the preferred form pressurized air is supplied to the cylinder from compressor 31 driven by the usual turbine 32. Air from the compressor flows thru pipe 33 to after cooler 35 to manifold 36 in frame 21 which communicates with ports 26. As is well known turbine or blower 32 is driven by exhaust gases from cylinder 24 which flow to manifold 39 thru pipe 40 to inlet 41 of the blower.

The exhaust opening 25 is preferably fitted with two exhaust closures shown as exhaust valves 42 one of which is depicted in FIGURE 1 of the drawings.

Each exhaust valve is driven by a control arrangement designated 44 shown as cam 45, mounted on cam shaft 46, which drives a push rod 47 and lever 48.

Separate and similar control means 44 may be utilized to drive each of the exhaust valves, and such an arrangement is shown in FIGURE 2 of the drawings. However, it will be clear that the exhaust valves can be operated as described herein by providing one cam having a contour which will cause operation of the exhaust valves as will be described hereinafter.

Now referring particularly to FIGURES 2 and 4 cams 45 and 45' are provided with contours 55 and 55' which move the exhaust valves as described hereinafter.

FIGURE 2 also shows gas injection cam 49 operative to permit gas flow to cylinder 24.

In order to regulate flow of air to cylinder 4 a regulating means 60 shown in FIGURES 1, 6 and 8 comprising a ring 61 is movably mounted in a recess 62 formed in the cylinder. The ring 61 includes ports 63 which may be moved into and out of alignment with the ports in cylinder 24.

More particularly, movement of ring 61 emanates from engine crankshaft 64 which drives a sprocket 65, or similar driving means, which in turn rotates cam 66. The cam actuates a rocker 67 which reciprocates rod 68 tensioned against spring 72 which is hinged at 69 to rod 70 connected to ring 61. An arrangement for operating two cylinders is shown in FIGURE 6 and involves addition of lever 72 which connects rod 68 to rod 70' of the 2nd cylinder 61'.

In operation both exhaust valves are opened at E by cams 45 and 45' according to contours 55 and 55'. Where four exhaust valves are used two valves may be actuated by each cam. In the preferred embodiment both exhaust valves are opened at about 30° before bottom center.

At about bottom center or A cam 66 moves the arrangement of levers and rods shown in FIGURE 6 to cause ports 63 to align with ports 26 of the cylinder to permit fluid to enter the cylinder.

Scavenging takes place for about 85° until $A_2$ at which point spring 74 returns the ring 61 so that the ports 63 are out of alignment with the ports 26 of the cylinder. Approximately 5° later at $E_2$ cam 46 causes one exhaust valve to close. About 20° later at $E_3$ cam 45 causes the second exhaust valve to close at which point all exhaust valves are fully closed. The remaining portion of the cycle will be obvious to one skilled in this art.

FIGURE 5 shows the effective valve area $A_e$ procured by the cam configuration, which is a summation of areas $A_e$ 1–2. Inlet port area is integrated to give $A_1$.

The combined area obtains maximum value during $E_1$ to $E_2$ period. Area is reduced by one half, or less, depending on lift of cam 15 during period $E_2$ to $E_3$, thus restricting air flow into exhaust manifold 8.

Related construction to liner 2 and piston 3 is indicated. It should be understood that other means for obtaining scavenge port opening at bottom dead center may be used and intent of such constructions is anticipated here.

FIGURE 10 shows cylinder pressure curve plotted versus crank travel and sequence of exhaust and scavenge events described above. The solid line indicates conventional late closing exhaust timing where $ps$ is pressure in scavenging receiver and $pc$ in cylinder at exhaust closing $E_3$. Dotted line $pc$ shown increased scavenging pressure $pc'$ with proposed cam configuration contemplated herein.

FIGURE 11 shows indicator card, or pressure volume diagram, where work energy gain by extended expansion is described. Point $E_0$ represents release point, or exhaust opening of conventional engine. Point E is latest closing which this concept achieves. The gain in work energy is shown in shaded portion $E_0E_1A_1$. The other events are shown on the card to depict the relative positions with respect to the pressure volume relationship. Expansion is therefore extended from $E_0$ to $E_1$ with substantial thermal efficiency improvement, in the order of 12 percent. Additionally a predicted power output increase of 12 percent is estimated based on theoretical calculations.

The complete cycle comprises the following sequence of events.

Fuel gas is injected into the engine cylinder about 20° before closing of all exhaust valves. Injection continues for about 50° during compression of air and fuel mixture which starts at or slightly before exhaust valve closing.

Ignition occurs at about 6° before top center of the stroke fires the charge and the piston is moved down by the expanding gases. Expansion terminates at about 30° before bottom center. At bottom center, or closely thereto, the scavenge ports open and pressurized cool air is admitted to purge exhaust gases. Scavenging terminates at about 85° after bottom center, and a reduced air flow continues directly after one, or pair of exhaust valves, close. After about 25° the second, or pair of exhaust valves close and compression is initiated. Thus the cycle is repeated with gas injection and ignition following in sequence.

Although the invention has been described with reference to specific apparatus it will be appreciated that a wide variety of changes may be made within the ability of one skilled in the art without departing from the scope of this invention. For example, some of the components of the apparatus may be reversed, certain features of the invention may be used independently of others, and equivalents may be substituted for the apparatus, all within the spirit and scope of the invention as defined by the appended claims.

What is claimed is:
1. In a two stroke internal combustion engine the combination of:
   (a) a cylinder,
   (b) a piston slideable in said cylinder and disposed for engagement with said cylinder,
   (c) crank shaft means connected to said piston for reciprocating the piston in the cylinder through a stroke having a top dead center position and a bottom dead center position,
   (d) inlet means including a plurality of ports extending through said cylinder at a point therein above the piston when it is in the bottom dead center position of the stroke,
   (e) at least two exhaust openings for said cylinder,
   (f) rotary sleeve regulating means about said cylinder wall,
   (g) means for rotating said rotary sleeve means to normally maintain said inlet means closed,
   (h) cam means connected between said crank shaft means and said rotary sleeve regulating means for rotating said rotary sleeve means to open the inlet openings when said piston is substantially at the bottom dead center position thereof,
   (i) an exhaust closure means for each of said exhaust openings disposed to maintain said exhaust openings normally closed and operative to conduct the flow of combusted gases from said cylinder through said exhaust openings,
   (j) cam means connected between said crank means and said exhaust closure means for opening each of said exhaust closure means before said piston reaches bottom dead center position of the stroke and for serially closing said exhaust closure means at different times during the movement of said piston from the bottom dead center position to the top dead center position of the stroke,
   (k) said cam means for the rotary sleeve means and said cam means for the exhaust closure means so connected to said crank shaft means as to permit unsymmetrical opening of said inlet opening means after said exhaust closure means are opened and unsymmetrical closing of said inlet opening means before the respective exhaust closure means are serially closed, (l) exhaust manifold means in communication with said cylinder exhaust openings, (m) inlet manifold means in communication with said inlet regulating means, (n) turbo-charging means including a turbine in communication with said exhaust manifold and a compressor in communication with said inlet manifold, (o) and said exhaust closure means disposed to operate independently of engine load conditions, whereby scavenging of combustion gases occurs independently of engine load whenever said rotary sleeve means and both exhaust means are opened so that all combusted gases are discharged into said exhaust manifold to thereby obtain improved combustion cycle efficiency for two stroke internal combustion engine operation.

2. The apparatus in claim 1 wherein said exhaust cam means comprise two non symmetrical fixed cams mounted on a common shaft closing exhaust valve means at different points after said inlet means closes and opening exhaust valves before said inlet means opens.

3. In the combination as claimed in claim 1 wherein said exhaust cam means is operative to open the exhaust closure approximately 30° before piston bottom dead center.

4. The apparatus in claim 1 wherein said exhaust cam means is operative to close one exhaust closure approximately 90° after bottom dead center and to close a second exhaust closure serially 110° after bottom dead center.

References Cited by the Examiner

UNITED STATES PATENTS

| | | | |
|---|---|---|---|
| 2,025,018 | 12/1935 | Mondragon | 123—65 |
| 2,054,963 | 9/1936 | Atteslander | 123—65 |
| 2,061,439 | 11/1936 | Quantz | 123—65 |
| 2,327,645 | 8/1943 | Hughes | 123—65 |
| 2,535,532 | 12/1950 | Dumanois et al. | 123—65 |

MARK NEWMAN, *Primary Examiner.*

WENDELL E. BURNS, *Examiner.*